US010392465B2

(12) United States Patent
Sato et al.

(10) Patent No.: US 10,392,465 B2
(45) Date of Patent: Aug. 27, 2019

(54) POLYMERIZED ROSIN COMPOUND AND PRODUCTION METHOD THEREFOR

(71) Applicant: ARAKAWA CHEMICAL INDUSTRIES, LTD., Osaka-shi (JP)

(72) Inventors: Yoshimasa Sato, Ibaraki (JP); Naoki Kamatani, Ibaraki (JP); Kouji Takahashi, Ibaraki (JP); Kohei Hatakeda, Ibaraki (JP); Hideharu Takeuchi, Ibaraki (JP)

(73) Assignee: Arakawa Chemical Industries, Ltd., Osaka (JP)

( * ) Notice: Subject to any disclaimer, the term of this patent is extended or adjusted under 35 U.S.C. 154(b) by 0 days.

(21) Appl. No.: 14/422,633

(22) PCT Filed: Aug. 20, 2013

(86) PCT No.: PCT/JP2013/072209
§ 371 (c)(1),
(2) Date: Feb. 19, 2015

(87) PCT Pub. No.: WO2014/030652
PCT Pub. Date: Feb. 27, 2014

(65) Prior Publication Data
US 2015/0232604 A1 Aug. 20, 2015
US 2017/0152341 A9 Jun. 1, 2017

(30) Foreign Application Priority Data

Aug. 22, 2012 (JP) ................. 2012-183262

(51) Int. Cl.
C08G 8/34 (2006.01)
C09F 1/04 (2006.01)
C08G 63/54 (2006.01)
G03G 9/087 (2006.01)
C08G 63/553 (2006.01)
C08G 63/199 (2006.01)

(52) U.S. Cl.
CPC ............ C08G 8/34 (2013.01); C08G 63/199 (2013.01); C08G 63/54 (2013.01); C08G 63/553 (2013.01); C09F 1/04 (2013.01); G03G 9/08746 (2013.01); G03G 9/08748 (2013.01)

(58) Field of Classification Search
CPC ........... C09F 1/04; C08G 63/199; C08G 8/34; C08G 63/54; C08G 63/553; G03G 9/08746; G03G 9/08748
USPC ...................................................... 530/211
See application file for complete search history.

(56) References Cited

U.S. PATENT DOCUMENTS 3,518,120 A 6/1970 Lello et al.
4,414,146 A 11/1983 Olechowski et al.
5,372,852 A 12/1994 Titterington et al.
5,380,769 A 1/1995 Titterington et al.
5,399,660 A 3/1995 Uchida et al.
5,502,476 A 3/1996 Neal et al.
5,691,756 A 11/1997 Rise et al.
5,805,191 A 9/1998 Jones et al.
5,808,645 A 9/1998 Reeves et al.
5,856,650 A 1/1999 Rise et al.
2012/0101250 A1 4/2012 Sakuma et al.
2013/0022907 A1 1/2013 Fukagawa et al.

FOREIGN PATENT DOCUMENTS

JP S47-45774 11/1972
JP 06-33395 A 2/1994
JP H06-240195 8/1994
JP 2000-212493 8/2000
(Continued)

OTHER PUBLICATIONS

R. G. Sinclair et al "Influence of Reaction Conditions on the Dimerization of Abietic Acid and Rosin "Ind. Eng. Chem. Prod. Res. Develop., vol. 9, No. 1, Mar. 1970.*
"Conjugated system", Wikipedia, Mar. 2016.*
R.Fujii et al "Dimeric Components From the Dimerization of Abietic Acid", JAOCS, vol. 64, No. 8 (Aug. 1987).*
Liu et al "Dimerization of rosin using Bronsted-Lewis acidic ionic liquid as catalyst" Mar. 2008.*
A.Llevot et al "Dimerization of abietic acid for the design of renewable polymers by ADMET", Nov. 2014.*
(Continued)

Primary Examiner — Ling Siu Choi
Assistant Examiner — Gennadiy Mesh
(74) Attorney, Agent, or Firm — Knobbe, Martens, Olson & Bear, LLP

(57) ABSTRACT

A polymerized rosin compound includes a rosin dimer component (A) including a bifunctional rosin dimer component (a1) represented by formula (1): ROOC—X—COOR. In this formula, X represents a rosin dimer residue derived from abietic acid, neoabietic acid, or palustric acid, which are resin acids having conjugated double bonds; and R represents hydrogen, an alkyl group of 1 to 5 carbon atoms, or a benzyl group. The rosin dimer component (A) contains a bifunctional rosin dimer component (a1) in the amount of 80% by weight or more and a rosin trimer or higher oligomer component (B) in the range from 1.5 to 3.7% by weight, wherein the rosin dimer component is free of a monofunctional rosin dimer component (a2) having one functional group represented by formula (2): ROOC—, wherein R represents hydrogen, an alkyl group of 1 to 5 carbon atoms, or a benzyl group, and free from functional group containing rosin dimer component (a3), wherein the functional group represented by formula (2): ROOC—, wherein R represents hydrogen, an alkyl group of 1 to 5 carbon atoms, or a benzyl group. The polymerized rosin compound contains a large amount of the bifunctional rosin dimer component that makes it possible to obtain linear polymer with a high molecular weight.

3 Claims, No Drawings

(56) References Cited

FOREIGN PATENT DOCUMENTS

| | | | |
|---|---|---|---|
| JP | 2005-336424 | | 12/2005 |
| JP | 2006-045396 | A | 2/2006 |
| JP | 2006-510690 | | 3/2006 |
| JP | 2006-160806 | | 6/2006 |
| JP | 2011-026569 | A | 2/2011 |
| JP | 2012-107175 | A | 6/2012 |
| JP | 2012-144514 | * | 8/2012 |
| WO | 2004-056837 | A1 | 7/2004 |
| WO | WO 2012/086409 | A1 | 6/2012 |

OTHER PUBLICATIONS

Extended European Search Report issued in Application No. 13830814.3 dated Jul. 16, 2015.

Gigante, et al., Photodimerization of aromatic resin acids, Journal of Natural Products, 1991, 54(1), p. 247-253.

Gigante, et al., The structure of an abietic acid dimer, Journal of the Chemical Society, Chemical Communications, 13, 1986, p. 1038-1039.

Office Action dated Jan. 12, 2016 in corresponding CN Application No. 201380044005.8.

Office Action dated Jan. 12, 2016 in corresponding JP Application No. 2014-531641.

Office Action dated Nov. 7, 2016 in corresponding CN Application No. 201380044005.8.

Japanese Office Action in corresponding JP Application No. 2014-531641 dated Aug. 24, 2016.

Office Action dated May 17, 2016 in corresponding TW Application No. 102129926.

Office Action dated Apr. 26, 2017 in corresponding CN Application No. 201380044005.8.

* cited by examiner

POLYMERIZED ROSIN COMPOUND AND PRODUCTION METHOD THEREFOR

CROSS-REFERENCE TO RELATED APPLICATIONS

This application is the U.S. National Phase under 35. U.S.C. § 371 of International Application PCT/JP2013/072209, filed Aug. 20, 2013, which claims priority to Japanese Patent Application No. 2012-183262, filed Aug. 22, 2012. The disclosures of the above-described applications are hereby incorporated by reference in their entirety.

TECHNICAL FIELD

The invention relates to a polymerized rosin compound and a method for production thereof. The polymerized rosin compound of the invention is suitable for use in applications where polymerized rosin is conventionally used. The polymerized rosin compound of the invention can also be used as a dicarboxylic acid component for a variety of polymers such as polyester resins. Polyester resins in which a polymerized rosin skeleton is incorporated in the main skeleton can be used, for example, as toner resins, film resins, paint resins, etc.

BACKGROUND ART

Polymerized rosin is resin that is produced by polymerization of rosin such as gum rosin, wood rosin, or tall oil rosin. Polymerized rosin and derivatives such as polymerized rosin ester compounds have a high level of pigment dispersing ability, compatibility, cohesion and adhesion, and other properties, and therefore are advantageously used as binders or additives in a wide variety of fields such as printing ink, paint, pressure-sensitive adhesives or adhesives, and flux.

A variety of methods have been conventionally studied for producing polymerized rosin. There have been proposed, for example, a method using, as a catalyst, a polymer having pendant sulfonic acid groups (see Patent Document 1), and a method using aliphatic sulfonic acid as a catalyst (see Patent Document 2). There is also a well-known method that includes subjecting rosin acid to a polymerization reaction in an organic solvent such as toluene or xylene using, as a catalyst, an acidic compound such as formic acid, p-toluenesulfonic acid, methanesulfonic acid, hydrogen fluoride, zinc chloride, aluminum chloride, or titanium tetrachloride and removing the catalyst, the solvent, and the unreacted rosin after the reaction is completed, so that polymerized rosin is obtained.

In recent years, for global environment protection, alternatives to petroleum resources have been studied, and a variety of natural resources receive attention. Rosin, which can be obtained from turpentine, is a naturally-occurring material containing resin acids such as abietic acid and pimaric acid. Among the resin acids, abietic acid is known to be used as a material for polymers. For example, polymers obtained by polymerization of abietic acid and polyhydric alcohols are known (see Patent Document 3).

PRIOR ART DOCUMENTS

Patent Documents

Patent Document 1: U.S. Pat. No. 4,414,146
Patent Document 2: JP-A-2006-45396
Patent Document 3: JP-A-06-33395

SUMMARY OF THE INVENTION

Problems to be Solved by the Invention

However, the polymer disclosed in Patent Document 3 is not a linear polymer with a high molecular weight. This is because abietic acid is a monofunctional monocarboxylic acid, which is not incorporated in the main skeleton but grafted at the end of or on the main chain of the polymer, so that it is not incorporated in a large amount in the polymer. In the polymer, therefore, the characteristics of rosin, such as heat resistance, are not exploited enough to improve the function.

It is also difficult to obtain a high-molecular-weight linear polymer using commercially available polymerized rosin. This is because commercially available polymerized rosin is a mixture of 55 to 80% by weight of a rosin dimer component (in which the content of a two carboxyl groups-containing rosin dimer component is generally from 27.5 to 40% by weight) and 45 to 20% by weight of a rosin acid monomer component. In order to obtain a high-molecular-weight linear polymer, it is necessary to further increase the concentration of the rosin dimer component. There is known a method for increasing the content of the rosin component by removing unreacted rosin acid by distillation under reduced pressure. Unfortunately, even using polymerized rosin obtained by this method, which has a higher rosin dimer component content, a high-molecular-weight linear polymer is not successfully obtained.

It is an object of the invention to provide a polymerized rosin compound with a high rosin dimer component content and to provide a method for producing such a polymerized rosin compound.

It is another object of the invention to provide a method for producing a polyester resin using such a polymerized rosin compound with a high rosin dimer component content and to provide a polyester resin produced by such a method.

Means for Solving the Problems

To solve the problems, the inventors have made earnest studies and arrived at the idea that two or more reactive functional groups should be introduced into the molecular structure of rosin so that the rosin can form a linear polymer in which the rosin is incorporated in the main skeleton. In addition, the inventors have found that commercially available polymerized rosin contains the following components: trimer or higher oligomers of rosin acid, in which at least three molecules of rosin acid are linked together; a two carboxyl groups-containing rosin dimer (hereinafter referred to as the "dicarboxylic rosin dimer"), in which two molecules of rosin acid are linked together; and a product derived from the dicarboxylic rosin dimer by elimination of one carboxyl group (hereinafter referred to as the "monocarboxylic rosin dimer") and a product derived from the dicarboxylic rosin dimer by elimination of two carboxyl groups (hereinafter referred to as the "dimer decomposition product"), which are produced when decarboxylation of the dicarboxylic rosin dimer proceeds as a side reaction during the production of the polymerized rosin. The inventors have also found that when unreacted rosin acid is removed by distillation under reduced pressure after the reaction, decarboxylation occurs to increase the amount of the monocarboxylic rosin dimer and the trimer or higher oligomers of rosin acid. The inventors have found that when the resulting polymerized rosin is used, the resulting polymer end is capped with the monocarboxylic rosin dimer, so that the molecular weight of the polymer will not increase. On the other hand, the inventors have found that an esterification product of commercially available polymerized rosin has good thermal stability and that after the esterification, decarboxylation-induced increase in the amount of the monocarboxylic rosin dimer or an ester thereof does not occur even when a rosin ester monomer derived from the unreacted monomer (rosin acid) is removed from the polymerized rosin by distillation under reduced pressure. However, polymeric materials such as trimer or higher oligomers of rosin acid or rosin ester and the monocarboxylic rosin dimer or an ester thereof are difficult to remove by distillation under reduced pressure, recrystallization, or other methods. In order to obtain a high-molecular-weight liner polymer, therefore, it is necessary to suppress decarboxylation and to synthesize a rosin dimer in such a state that carboxyl groups or carboxylates are selectively maintained. Thus, the inventors have accomplished the invention based on the following findings. When the specific rosin compound used as a starting material is rosin ester, two rosin molecules can be linked together to form a dimer, and a rosin dimer component having two functional groups (carboxyl groups and/or carboxylate groups) (hereinafter referred to as a "bifunctional rosin dimer") can be selectively synthesized, so that the monocarboxylic rosin dimer or an ester thereof and the dimer decomposition product, which are produced when decarboxylation of the bifunctional rosin dimer proceeds as a side reaction during the production of the polymerized rosin compound, can be reduced, which makes it possible to solve the problems.

That is, the invention 1 is related to a polymerized rosin compound, including a rosin dimer component (A) including a bifunctional rosin dimer component (a1) represented by formula (1): ROOC—X—COOR, wherein X represents a rosin dimer residue, and R represents hydrogen, an alkyl group of 1 to 5 carbon atoms, or a benzyl group, the rosin dimer component (A) having a content of the bifunctional rosin dimer component (a1) of 80% by weight or more, the polymerized rosin compound having a content of the rosin dimer component (A) of 80% by weight or more.

The invention 2 is related to the polymerized rosin compound described in the invention 1, wherein the rosin dimer component (A) contains (a10) a dicarboxylate-containing rosin dimer represented by formula (1'): $R^1OOC-X-COOR^1$, wherein X represents a rosin dimer residue, and R represents an alkyl group of 1 to 5 carbon atoms or a benzyl group, and the rosin dimer component (A) has a content of the dicarboxylate-containing rosin dimer (a10) of 80% by weight or more.

The invention 3 is related to the polymerized rosin compound described in the invention 1 or 2, which contains (B) a rosin trimer or higher oligomer component, a monofunctional rosin dimer component (a2) having one functional group represented by formula (2): ROOC—, wherein R represents hydrogen, an alkyl group of 1 to 5 carbon atoms, or a benzyl group, and a functional group-free rosin dimer component (a3) free of the functional group represented by formula (2): ROOC—, wherein R represents hydrogen, an alkyl group of 1 to 5 carbon atoms, or a benzyl group, the polymerized rosin compound having a total content of the components (B), (a2), and (a3) of 20% by weight or less.

The invention 4 is related to the polymerized rosin compound described in the invention 2 or 3, wherein the dicarboxylate-containing rosin dimer (a10) represented by formula (1'): $R^1OOC-X-COOR^1$, wherein X represents a rosin dimer residue, and R represents an alkyl group of 1 to 5 carbon atoms or a benzyl group, comprises a dimethyl ester group-containing rosin dimer represented by formula (1''): $CH_3OOC-X-COOCH_3$, wherein X represents a rosin dimer residue.

The invention 5 is related to a method for producing the polymerized rosin compound described in any one of the invention 1 to 4, the method including polymerizing a raw material using a catalyst for producing polymerized rosin, wherein the raw material comprises a rosin ester represented by formula (3): $X^1-COOR^1$, wherein $X^1$ represents a rosin residue, and $R^1$ represents an alkyl group of 1 to 5 carbon atoms or a benzyl group.

The invention 6 is related to the method described in the invention 5, wherein the catalyst for producing polymerized rosin is at least one selected from the group consisting of sulfuric acid, formic acid, acetic acid, phosphoric acid, p-toluenesulfonic acid, methanesulfonic acid, a solid acid having a sulfonic acid group, and zinc chloride.

The invention 7 is related to the method described in the invention 5 or 6, wherein the purity of the rosin ester in the raw material is 80% by weight or more, and the total content of rosin ester components derived from at least one resin acid selected from abietic acid, neoabietic acid, and palustric acid in the rosin ester is 40% by weight or more.

The invention 8 is related to a method for producing a polyester resin, the method including allowing at least a dicarboxylic acid component and a dialcohol component to react together, wherein the dicarboxylic acid component includes the polymerized rosin compound according to any one of the invention 1 to 4.

The invention 9 is related to the method described in the invention 8, wherein the polyester resin has a number average molecular weight of 3,000 to 400,000 and a weight average molecular weight of 3,000 to 400,000.

The invention 10 is related to the method described in the invention 8 or 9, wherein the polyester resin has a thermal decomposition temperature of 350° C. or more.

The invention 11 is related to a polyester resin including the product obtained by the method described in any one of the invention 8 to 9.

Effect of the Invention

The invention makes it possible to obtain a polymerized rosin compound having a high content of the rosin dimer component (A) and having a high content of the bifunctional rosin dimer component (a1) in the rosin dimer component (A). The polymerized rosin compound of the invention contains a large amount of the bifunctional rosin dimer component (a1). Therefore, when the polymerized rosin compound of the invention is used as a dicarboxylic acid component to form polyester resin, a rosin dimer skeleton is successfully incorporated in the main skeleton of the polymer, in contrast to the case that conventional polymerized rosin is used as a dicarboxylic acid component to form polyester resin, and the resulting polyester resin also has a higher molecular weight (a higher number average molecular weight and a higher weight average molecular weight). The method of the invention for producing polyester resin allows the production of polyester resin with a higher glass transition temperature, a higher thermal decomposition temperature, a higher level of water resistance or heat resistance, and a higher molecular weight.

MODE FOR CARRYING OUT THE INVENTION

The polymerized rosin compound of the invention includes a rosin dimer component (A) including a bifunctional rosin dimer component (a1) represented by formula (1): ROOC—X—COOR, wherein X represents a rosin dimer residue, and R represents hydrogen, an alkyl group of 1 to 5 carbon atoms, or a benzyl group, wherein the rosin dimer component (A) contains a content of the bifunctional rosin dimer component (a1) of 80% by weight or more and the polymerized rosin compound contains a content of the rosin dimer component (A) of 80% by weight or more. As used herein, the term "rosin dimer residue" refers to the portion of a rosin dimer that is derived from the rosin dimer by removal of the two functional groups (ROOC—).

The rosin dimer component (A) includes a compound having a structure in which rosin forms a dimer. The rosin dimer component (A) may include not only the bifunctional rosin dimer component (a1) but also a monofunctional rosin dimer component (a2) having one functional group represented by formula (2): ROOC—, wherein R represents hydrogen, an alkyl group of 1 to 5 carbon atoms, or a benzyl group, and/or a functional group-free rosin dimer component (a3) in which the functional group represented by formula (2): ROOC—, wherein R represents hydrogen, an alkyl group of 1 to 5 carbon atoms, or a benzyl group, is absent. The monofunctional rosin dimer component (a2) is a product derived from the bifunctional rosin dimer component (a2) by elimination (decarboxylation) of one of the functional groups (ROOC—). The functional group-free rosin dimer component (a3) is a decomposition product derived from the bifunctional rosin dimer component (a1) by elimination (decarboxylation) of the two functional groups (ROOC—). For use in the synthesis of high-molecular-weight polymers such as polyester resins, the polymerized rosin compound of the invention preferably contains 80% by weight of the rosin dimer component (A) including the components (a1), (a2), and (a3) in total, more preferably contains 85% by weight or more of the rosin dimer component (A), and even more preferably contains 90% by weight or more of the rosin dimer component (A). Besides the rosin dimer component (A), the polymerized rosin compound of the invention may contain (B) a rosin trimer or higher oligomer component, an unreacted rosin ester, or rosin acid (resin acid). The rosin trimer or higher oligomer component (B) may include a trimer or higher oligomer of rosin acid (resin acid) or an ester of a trimer or higher oligomer of rosin acid (resin acid).

The bifunctional rosin dimer component (a1) may have any structure in which rosin forms a dimer having the two functional groups (ROOC—). The bifunctional rosin dimer component (a1) may have a structure represented by, for example, formula (1A) or (1B) below, wherein R represents hydrogen, an alkyl group of 1 to 5 carbon atoms, or a benzyl group.

[Formula 1]

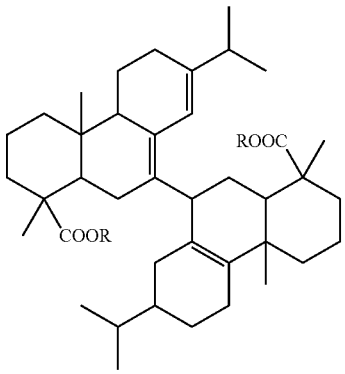

Formula (1A)

[Formula 2]

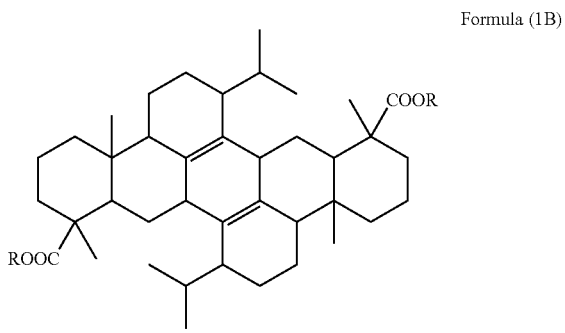

Formula (1B)

The functional group (ROOC—) is a carboxyl group and/or a carboxylate group. In the bifunctional rosin dimer component (a1), the two functional groups may be both carboxylate groups (a10), one of them may be a carboxyl group while the other may be a carboxylate group (a11), or they may be both carboxyl groups (a12). In the bifunctional rosin dimer component (a1), the carboxyl group (a11) or groups (a12) can be obtained by hydrolysis of the carboxylate group or groups (a10). Therefore, the bifunctional rosin dimer component (a1) may be hydrolyzed as needed to form a rosin dimer having the carboxyl group (a11) or groups (a12).

The bifunctional rosin dimer component (a1) is preferably a dicarboxylate-containing rosin dimer (a10) in which the functional groups (ROOC—) are both carboxylate groups. The dicarboxylate-containing rosin dimer (a10) may be represented by formula (1'): $R^1OOC—X—COOR^1$, wherein X represents a rosin dimer residue, and $R^1$ represents an alkyl group of 1 to 5 carbon atoms or a benzyl group.

The content of the dicarboxylate-containing rosin dimer (a10) in the rosin dimer component (A) is preferably 80% by weight or more. The dicarboxylate-containing rosin dimer (a10) preferably makes up 80% by weight or more, more preferably 90% by weight or more, even more preferably 95% by weight or more, further more preferably 99% by weight or more of the bifunctional rosin dimer component (a1). The dicarboxylate-containing rosin dimer (a10) may make up the whole of the bifunctional rosin dimer component (a1).

In the polymerized rosin compound of the invention, the content of the bifunctional rosin dimer component (a1) in the rosin dimer component (A) is 80% by weight or more. The content of the bifunctional rosin dimer component (a1)

is preferably 85% by weight or more, more preferably 90% by weight or more, even more preferably 100% by weight.

In the polymerized rosin compound of the invention, the total content of the rosin trimer or higher oligomer component (B), the monofunctional rosin dimer component (a2), and the functional group-free rosin dimer component (a3) is preferably 20% by weight or less. The total content is more preferably 15% by weight or less, even more preferably 10% by weight or less. In this case, irregular polymerization-induced gelation can be prevented so that a linear polymer (polyester resin) can be obtained from the polymerized rosin compound of the invention. In the polymerized rosin compound of the invention, the content of the rosin trimer or higher oligomer component (B) is preferably 15% by weight or less, more preferably 10% by weight or less for the synthesis of a linear polymer (polyester resin). The content of the monofunctional rosin dimer component (a2) is preferably 15% by weight or less, more preferably 5% by weight or less for the synthesis of polyester resin with a high molecular weight. The content of the functional group-free rosin dimer component (a3) is preferably 10% by weight or less, more preferably 5% by weight or less for the reduction of the amount of the unreacted material.

The polymerized rosin compound of the invention can be obtained as follows. A raw material containing a rosin ester represented by formula (3): $X^1$—COOR$^1$, wherein $X^1$ represents a rosin residue, and $R^1$ represents an alkyl group of 1 to 5 carbon atoms or a benzyl group, is subjected to polymerization using a catalyst. The product is then subjected to purification. As used herein, the term "rosin residue" refers to the portion of a rosin ester that is derived from the rosin ester by removal of the functional group (ROOC—). The rosin ester used for the raw material may be an ester of natural rosin. Examples of natural rosin include gum rosin, tall oil rosin, wood rosin, and the like. These may be subjected to purification such as distillation and then used so that a polymerized rosin compound with a better color tone can be obtained.

The purity of the rosin ester in the raw material is preferably 80% by weight or more, more preferably 90% by weight or more for better color tone. For the production of the polymerized rosin compound of the invention, the raw material preferably contains a large amount of a rosin ester derived from resin acid having conjugated double bonds, such as abietic acid, neoabietic acid, or palustric acid. The total content of a rosin ester or esters derived from at least one resin acid selected from abietic acid, neoabietic acid, and palustric acid in the rosin ester is preferably 40% by weight or more, more preferably 50% by weight or more in order to improve the yield of the rosin dimer component (A) in the resulting polymerized rosin compound.

Examples of the rosin ester include C1 to C5 esters of rosin, such as rosin methyl ester, rosin ethyl ester, rosin butyl ester, and rosin pentyl ester, and rosin benzyl ester. Rosin methyl ester is preferably used because after the reaction, the unreacted rosin ester can be easily removed by distillation under reduced pressure. Therefore, the bifunctional rosin dimer component (a1) is preferably a polymerized rosin compound including a dimethyl ester group-containing rosin dimer. The dimethyl ester group-containing rosin dimer can be represented by formula (1A) or (1B) above, wherein R represents a methyl group, and also can be represented by formula (1''): $CH_3OOC$—X—$COOCH_3$, wherein X represents a rosin ester dimer residue.

The rosin ester can be obtained by subjecting natural rosin and/or purified natural rosin and a monohydric alcohol to an esterification reaction. Any known process may be used for the esterification. The esterification may be, for example, a process that includes converting rosin acid (resin acid) in natural rosin to an acid chloride (rosin acid chloride) and allowing the acid chloride to react with an alcohol, or a process that includes allowing rosin acid to react with an alcohol under increased pressure for a certain period of time, then removing a mixed solution of the alcohol and water, adding a fresh alcohol, and repeating the reaction. Thionyl chloride method is preferably used to derive rosin acid chloride from rosin acid. Examples of the alcohol that may be used include alcohols of 1 to 5 carbon atoms, such as methanol, ethanol, propanol, isopropanol, butanol, isobutanol, tert-butyl alcohol, and pentanol, and benzyl alcohol.

A method for polymerizing the rosin ester includes subjecting the rosin ester to a thermal reaction. The polymerization reaction conditions are not restricted and may be appropriately selected and determined from conventionally known conditions. For example, the rosin ester may be polymerized in the presence of a catalyst optionally using an organic solvent.

The catalyst may be a known catalyst used in the production of polymerized rosin. Examples of the catalyst include sulfuric acid, formic acid, acetic acid, phosphoric acid, p-toluenesulfonic acid, methanesulfonic acid, a solid acid with sulfonic acid groups, a polymer with pendant sulfonic acid groups, such as polystyrene sulfonic acid, polyvinyl sulfonic acid, or a fluoropolymer with sulfonic acid type functional groups, hydrogen fluoride, zinc chloride, aluminum chloride, titanium tetrachloride, boron trifluoride, and a boron trifluoride derivative such as a boron trifluoride phenol complex, a boron trifluoride dimethyl ether complex, or a boron trifluoride diethyl ether complex. These may be used singly or in combination of two or more. The catalyst is preferably at least one selected from the group consisting of sulfuric acid, formic acid, phosphoric acid, p-toluenesulfonic acid, methanesulfonic acid, a solid acid with sulfonic acid groups, and zinc chloride, so that the catalyst can be easily removed after the reaction. The catalyst is preferably used in an amount of 0.1 to 90 parts by weight based on 100 parts by weight of the rosin ester. In order to suppress side reactions, the amount of the catalyst is preferably from 1 to 20 parts by weight.

The organic solvent may be of any type that does not inhibit the polymerization reaction of the rosin ester. Examples of the organic solvent include aromatic hydrocarbons such as toluene and xylene; aliphatic hydrocarbons such as heptane and octane; hydrocarbon ketones such as methyl ethyl ketone and methyl isopropyl ketone; hydrocarbon esters such as ethyl acetate and butyl acetate; hydrocarbon halides such as carbon tetrachloride, ethylene dichloride, trichloroethane, and tetratrichloroethane; and carboxyl group-containing organic acids such as acetic acid, propionic acid, butyric acid, anhydrides thereof, formic acid, chloroacetic acid, and lactic acid. These may be used singly or in appropriate combination of two or more. When formic acid or acetic acid is used as the organic solvent, formic acid or acetic acid can also function as the catalyst, which eliminates the need for using other catalysts. Formic acid or acetic acid may also be used together with the catalyst. In this case, formic acid or acetic acid may be used in the amount shown below. In the invention, the organic solvent is preferably an aromatic hydrocarbon or an aliphatic hydrocarbon, most preferably xylene, heptane, or octane so that after use, the solvent can be easily collected and reused. In the invention, as a non-limiting example, the organic solvent is generally used in an amount ranging from 5 to 900 parts by weight, more preferably from 10 to 500 parts by weight, based on 100 parts by weight of the rosin ester introduced into the reaction system.

As a non-limiting example, the polymerization reaction may be performed at a temperature of about 0 to about 200° C., preferably 40 to 200° C., for a period of time of about 0.5 to about 24 hours. After the polymerization is completed, if necessary, the solvent and catalyst used, the unreacted rosin ester, and decomposition products may be removed from the polymerization reaction product, when the polymerized rosin compound is obtained. The catalyst can be removed, for example, using water washing, neutralization with alkali, filtration, or other methods. The unreacted rosin ester and decomposition products can be removed by distillation under reduced pressure. The distillation under reduced pressure is preferably performed under the conditions of a temperature of 200 to 290° C. and a reduced pressure of 60 to 8,000 Pa.

The polymerized rosin compound of the invention, which contains a large amount of the bifunctional rosin dimer component (a1), is useful as a dicarboxylic acid component for the production of polyester resin. The polyester resin of the invention (hereinafter referred to as the "rosin polyester") can be obtained, for example, by reaction of at least a dicarboxylic acid component and a dialcohol component. In the method of the invention for producing the polyester, the polymerized rosin compound of the invention is used as the dicarboxylic acid component.

The dicarboxylic acid component may be used in combination with an additional dicarboxylic acid component other than the polymerized rosin compound. Such an additional dicarboxylic acid component may be at least one selected from the group consisting of an aromatic dicarboxylic acid and an aliphatic dicarboxylic acid. Specific examples include aromatic dicarboxylic acids such as phthalic acid, isophthalic acid, terephthalic acid, 1,4-naphthalenedicarboxylic acid, and 2,6-naphthalenedicarboxylic acid; and aliphatic dicarboxylic acids such as oxalic acid, malonic acid, succinic acid, glutaric acid, adipic acid, pimelic acid, suberic acid, azelaic acid, and sebacic acid. Other examples include unsaturated dibasic acids such as maleic acid, fumaric acid, citraconic acid, itaconic acid, and glutaconic acid; aromatic dibasic acids such as phthalic acid, isophthalic acid, and terephthalic acid; C1 to C20 alkyl- or alkenyl-substituted succinic acid such as dodecenyl succinic acid, dodecyl succinic acid, or octyl succinic acid; and a (meth)acrylic acid adduct of rosin.

The content of the polymerized rosin compound of the invention in the dicarboxylic acid component is preferably, but not limited to, 5 to 95% by weight, more preferably 20 to 90% by weight, for an increase in the thermal decomposition temperature.

In the production of the polyester resin, an additional acid component other than the dicarboxylic acid component may be used. If necessary, for example, a monocarboxylic acid or a tri- or polycarboxylic acid (including the corresponding carboxylic anhydride or lower ester) may also be used.

The monocarboxylic acid may be a fatty acid, monofunctional rosin, tert-butylbenzoic acid, or the like. The monocarboxylic acid is generally used in an amount of 10% by mole or less, preferably 5% by mole or less based on the total moles of all the carboxylic acid components.

Examples of the tri- or polycarboxylic acid include 1,2,4-butanetricarboxylic acid, trimellitic acid, naphthalenetricarboxylic acid, pyromellitic acid, maleated rosin, fumarated rosin, and acid anhydrides or lower esters thereof. The tri- or polycarboxylic acid is generally used in an amount of 10% by mole or less, preferably 5% by mole of less, based on the total moles of all the carboxylic acid components.

The dialcohol component may be of any type that does not inhibit the polymerization reaction for the rosin polyester.

The dialcohol component may be, for example, at least one selected from aliphatic diols. Examples of the dialcohol component include ethylene glycol, 1,2-propanediol, 1,3-propanediol, 1,2-butanediol, 1,3-butanediol, 1,4-butanediol, 2,3-butanediol, 1,4-butenediol, 2-methyl-1,3-propanediol, 1,5-pentanediol, neopentylglycol, 2-ethyl-2-methylpropane-1,3-diol, 2-butyl-2-ethylpropane-1,3-diol, 1,6-hexanediol, 3-methyl-1,5-pentanediol, 2-ethyl-1,3-hexanediol, 2,4-dimethyl-1,5-pentanediol, 2,2,4-trimethyl-1,3-pentanediol, 1,7-heptanediol, 1,8-octanediol, 1,9-nonanediol, 1,10-decanediol, diethylene glycol, triethylene glycol, and polyethylene glycol. Bisphenol A, hydrogenated bisphenol A, or other dialcohols may also be used. These dialcohol components may be used singly or in combination of two or more.

An additional alcohol component other than the above alcohol component may be used in the production of the polyester resin. If necessary, for example, a tri- or polyalcohol may also be used. Examples of the tri- or polyalcohol include glycerin, trimethylolpropane, 2-methylpropanetriol, pentaerythritol, dipentaerythritol, and sorbitol. These compounds may be used singly or in any appropriate combination.

As a non-limiting example, the tri or polyalcohol is generally used in an amount of 10% by mole or less, preferably 5% by mole or less based on the total moles of all the alcohol components.

The method of the invention for producing the rosin polyester may use any method appropriately selected from various known esterification reactions and transesterification reactions. For example, the method of the invention may be performed by a process that includes adding of all the carboxylic acid components and all the alcohol components to a given reaction vessel and subjecting the components to dehydration condensation at about 180 to about 300° C. in the presence or absence of an esterification catalyst while blowing inert gas into the vessel. Any transesterification or direct esterification may be used for the reaction process. The polycondensation may also be accelerated by a pressurizing method for increasing the reaction temperature or a method of allowing inert gas to flow under reduced or normal pressure.

There is no restriction to the ratio between all the carboxylic acid components to be added and all the alcohol components to be added. Usually, the amount of each component to be added may be determined in such a way that OH/COOH (equivalent ratio) is from about 1.2 to about 0.8, preferably from 0.9 to 1.1. The reaction can be monitored by measuring the acid value, viscosity, or softening point. The esterification catalyst may be a known conventional esterification catalyst such as a compound of at least one metal selected from antimony, titanium, tin, zinc, aluminum, and manganese. The reaction may be accelerated using such a catalyst. Examples of such a catalyst include zinc acetate, zinc oxide, stannous oxide, monobutyltin oxide, dibutyltin oxide, dibutyltin dilaurate, tetraalkyl orthotitanate, and zirconium alkoxide. The tetraalkyl orthotitanate is preferably tetraethyl orthotitanate or tetrabutyl orthotitanate. The zirconium alkoxide is preferably tetraethyl orthozirconate, tetraisopropyl orthozirconate, or the like. The esterification catalyst is preferably added in an amount of 0.01 to 5 parts by weight, more preferably 0.1 to 2 parts by weight, based on 100 parts by weight of the total of all the carboxylic acid and alcohol components.

The production method of the invention allows the production of a polyester resin with a high molecular weight, such as a polyester resin with a number average molecular weight of 3,000 to 400,000 and a weight average molecular weight of 3,000 to 400,000. The number average molecular weight is preferably from 5,000 to 300,000, more preferably from 8,000 to 200,000. The weight average molecular weight is preferably from 5,000 to 300,000, more preferably from 8,000 to 200,000. The molecular weight of the polyester resin preferably has a dispersity of 1.0 to 3.0.

The production method of the invention allows the production of a polyester resin with a thermal decomposition temperature of 350° C. or more. The thermal decomposition temperature is preferably from 350 to 450° C., more preferably from 350 to 420° C.

EXAMPLES

Hereinafter, the invention will be more specifically described with reference to examples and comparative examples. It will be understood that the examples are not intended to limit the invention. In each example, % is by weight. The methods described below were used to determine softening points and acid values, to analyze the rosin dimer component (A), to calculate the content of each rosin component, and evaluate glass transition temperatures and heat resistance.

(Method for Analysis of Rosin Methyl Ester)

The rosin component (resin acid component) in the rosin ester according to the invention was analyzed by gas chromatography (GC). GC was performed using Agilent 6890 manufactured by Agilent Technologies, Inc, in which the column used was BDS manufactured by Supelco. Rosin ester was dissolved in a 1:1 mixed solution of toluene and methanol before subjected to the measurement. The purity of rosin ester refers to the value obtained by subtracting the unreacted rosin content from the neutral component content, wherein the neutral component content is calculated from the sum of the area ratios of all the peaks detected at retention times ranging from 1.4 minutes to 6.0 minutes, and the unreacted rosin content is calculated from the acid value described below. The total content of esters of abietic acid, neoabietic acid, and palustric acid was calculated from the sum of the area ratios of the respective peaks. Concerning rosin methyl ester, for example, the palustric acid methyl ester peak detected at 8.4 min, the abietic acid methyl ester peak detected at 12.7 min, and the neoabietic acid methyl ester peak detected at 14.3 min were used in the calculation.

(Measurement of Softening Point)

The softening point of the polymerized rosin compound according to the invention was measured using JIS method (JIS K 2425 (ring and ball method)).

(Measurement of Acid Value)

The acid values of the rosin methyl ester, polymerized rosin compound, and rosin polyester according to the invention were measured using JIS method (JIS K 0070).

(Measurement of Hydroxyl Value)

The hydroxyl value of the rosin polyester according to the invention was measured using JIS method (JIS K 0070).

(Method for Analysis of Rosin Dimer Component (A))

The monofunctional rosin dimer component (a2) and the functional group-free rosin dimer component (a3) in the polymerized rosin compound according to the invention were identified by gas chromatography-mass spectrometry (GC-MS) analysis. GC-MS was performed using Agilent 6890 (GC) and Agilent 5973N (MS) manufactured by Agilent Technologies, Inc, in which the column used was DB-5 manufactured by Agilent Technologies, Inc. The polymerized rosin compound was dissolved in a 1:1 mixed solution of toluene and methanol before subjected to the measurement. The functional group-free rosin dimer component (a3) corresponds to all peaks with an m/z of 520 detected at retention times ranging from 22 minutes to 24 minutes. The monofunctional rosin dimer component (a2) and the bifunctional rosin dimer (a1) each corresponds to all peaks with each corresponding molecular weight (m/z). For example, when the compound of formula (1) in which R is methyl is produced, the monofunctional rosin dimer component (a2) in the resulting polymerized rosin compound corresponds to all peaks with an m/z of 574 detected at retention times ranging from 24 minutes to 32 minutes, and the bifunctional rosin dimer (a1) corresponds to all peaks with an m/z of 632 detected at retention times ranging from 33 minutes to 44 minutes. In Table 3, the content is shown to be 0 when the monofunctional rosin dimer component (a2) or the functional group-free rosin dimer component (a3) was not detected. When the monofunctional rosin dimer component (a2) was detected, the content shown in the table is the value obtained by the method described below for calculating the content of each rosin component.

(Method for Calculating the Content of Each Rosin Component)

The content of each rosin component according to the invention was determined using gel permeation chromatography (GPC). GPC was performed using HLC-8220 manufactured by Tosoh Corporation, in which the column used was TSKgel Column manufactured by Tosoh Corporation. The measurement was performed using THF as a solvent at a flow rate of 1.0 ml/min. Table 3 shows the area ratio of each resulting component peak as the content of each of the rosin trimer or higher oligomer component (B), the rosin dimer component (A) (the bifunctional rosin dimer component (a1), the monofunctional rosin dimer component (a2), and the functional group-free rosin dimer component (a3)), and the rosin acid and rosin ester component.

(Method for Measuring the Number Average Molecular Weight Mn, Weight Average Molecular Weight Mw, and Molecular Weight Dispersity Mw/Mn of Rosin Polyester)

The number average molecular weight, weight average molecular weight, and molecular weight dispersity of the rosin polyester according to the invention were determined using gel permeation chromatography (GPC). GPC was performed using HLC-8220 manufactured by Tosoh Corporation, in which the column used was TSKgel Column manufactured by Tosoh Corporation. The measurement was performed under the following conditions: sample concentration, 1.0%; solvent, THF; flow rate, 0.6 ml/min; sample injection volume, 10 µl; measurement temperature, 40° C.; RI detector. The calibration curve was prepared using 10 samples of TSK Standard Polystyrene manufactured by Tosoh Corporation: A-1000, A-5000, F-1, F-2, F-4, F-10, F-20, F-40, F-80, and F-128.

(Measurement of Glass Transition Temperature)

The glass transition temperature Tg of the rosin polyester was measured with a thermal analyzer DSC 3100S manufactured by Bruker AXS. Table 5 shows the glass transition temperature measured at a nitrogen flow rate of 200 ml/minute and a rate of temperature rise of 10° C./minute.

(Measurement of Thermal Decomposition Temperature)

The thermal decomposition temperature of the rosin polyester was measured with a thermogravimetry-differential thermal analyzer TG-DTA 2000S manufactured by Bruker AXS at a nitrogen flow rate of 200 ml/minute and a rate of temperature rise of 5° C./minute. The thermal decomposition temperature shown in Table 5 is the temperature obtained when 10% weight loss was observed.

Production Example 1 (Synthesis of Prototype 1 (Purified Rosin Methyl Ester))

A reactor equipped with a thermometer, a stirrer, a nitrogen introducing tube, and a pressure reducing device was charged with 100 g of crude rosin (Chinese gum rosin) with an acid value of 170.0 mgKOH/g, 100 g of xylene, and 83.3 g of methanol. With stirring, 46.4 g of thionyl chloride was added dropwise to the reactor over 2 hours so that the crude rosin was subjected to methyl esterification. After the dropwise addition was completed, the mixture was heated with stirring at a reflux temperature for 5 hours. Subsequently, after xylene and methanol were removed under the conditions of a liquid temperature of less than 200° C. and a reduced pressure of 1,300 Pa, the product was distilled under the conditions of a liquid temperature of 230° C. and a reduced pressure of 1,200 Pa, so that 70 g of purified rosin methyl ester (prototype 1) was obtained. Its acid value was 0.5 mgKOH/g (unreacted rate 0.3%). GC measurement showed that the neutral component content of prototype 1 was 1.1% (rosin ester purity: 98.6%) and the total content of abietic acid, neoabietic acid, and palustric acid in prototype 1 was 74.7%.

Production Example 2 (Synthesis of Prototype 2 (Purified Rosin Ethyl Ester))

A reactor equipped with a thermometer, a stirrer, a nitrogen introducing tube, and a pressure reducing device was charged with 100 g of crude rosin (Chinese gum rosin) with an acid value of 170.0 mgKOH/g, 100 g of xylene, and 120.0 g of ethanol. With stirring, 46.4 g of thionyl chloride was added dropwise to the reactor over 2 hours so that the crude rosin was subjected to ethyl esterification. After the dropwise addition was completed, the mixture was heated with stirring at a reflux temperature for 5 hours. Subsequently, after xylene and ethanol were removed under the conditions of a liquid temperature of less than 200° C. and a reduced pressure of 1,300 Pa, the product was distilled under the conditions of a liquid temperature of 240° C. and a reduced pressure of 1,200 Pa, so that 75 g of purified rosin ethyl ester (prototype 2) was obtained. Its acid value was 0.4 mgKOH/g (unreacted rate 0.2%). GC measurement showed that the neutral component content of prototype 2 was 1.5% (rosin ester purity: 98.3%) and the total content of abietic acid, neoabietic acid, and palustric acid in prototype 2 was 72.6%.

Production Example 3 (Synthesis of Prototype 3 (Purified Rosin Butyl Ester))

A reactor equipped with a thermometer, a stirrer, a nitrogen introducing tube, and a pressure reducing device was charged with 100 g of crude rosin (Chinese gum rosin) with an acid value of 170.0 mgKOH/g, 100 g of xylene, and 193.0 g of butanol. With stirring, 46.4 g of thionyl chloride was added dropwise to the reactor over 2 hours so that the crude rosin was subjected to butyl esterification. After the dropwise addition was completed, the mixture was heated with stirring at a reflux temperature for 5 hours. Subsequently, after xylene and methanol butanol were removed under the conditions of a liquid temperature of less than 200° C. and a reduced pressure of 1,300 Pa, the product was distilled under the conditions of a liquid temperature of 250° C. and a reduced pressure of 1,200 Pa, so that 80 g of purified rosin ethyl ester (prototype 3) was obtained. Its acid value was 0.6 mgKOH/g (unreacted rate 0.4%). GC measurement showed that the neutral component content of prototype 2 was 1.6% (rosin ester purity: 98.0%) and the total content of abietic acid, neoabietic acid, and palustric acid in prototype 2 was 75.1%.

Example 1 (Synthesis of Polymerized Rosin Compound 1 (Compound of Formula (1) in which R is Hydrogen or Methyl))

A reactor equipped with a condenser tube, a thermometer, a stirrer, and a nitrogen introducing tube was charged with 900 g of prototype 1 (purified rosin methyl ester) produced by ARAKAWA CHEMICAL INDUSTRIES, LTD., 900 g of xylene, 45.0 g of zinc chloride as a catalyst, and 45.0 g of sulfuric acid as a catalyst. Under a nitrogen stream, the mixture was subjected to a polymerization reaction at 145° C. for 6 hours. The xylene solution of the reaction product was washed with a mixture of 7 g of concentrated hydrochloric acid and 500 g of warm water and then further washed twice each with 500 g of warm water. After the washing, xylene was removed from the xylene solution by distillation under the conditions of a liquid temperature of less than 200° C. and a reduced pressure of 6,000 Pa. Decomposition products of the purified rosin methyl ester and the unreacted purified rosin methyl ester were removed by distillation under the conditions of a liquid temperature of 275° C. and a reduced pressure of 150 Pa, so that 405 g of polymerized rosin compound 1 was obtained. Polymerized rosin compound 1 had a softening point of 110° C. and an acid value of 0.5 mgKOH/g. GC/MS measurement showed that neither the monofunctional rosin dimer component (a2) nor the functional group-free rosin dimer component (a3) was detected in the rosin dimer component (A). GPC measurement showed that polymerized rosin compound 1 had a rosin dimer component (A) content of 91.6% (the rosin dimer component (A) had a bifunctional rosin dimer component (a1) content of 100%, and the dimethyl ester group-containing rosin dimer made up almost the whole of the bifunctional rosin dimer component (a1)), a content of rosin acid and rosin ester monomers of 5.4%, and a content of the rosin trimer or higher oligomer component (B) of 3.0%.

Example 2 (Synthesis of Polymerized Rosin Compound 2 (Compound of Formula (1) in which R is Hydrogen or Methyl))

The same process as in Example 1 was performed under the reaction conditions shown in Table 1, except that 45.0 g of zinc chloride and 45.0 g of an aqueous solution of 85% phosphoric acid were used instead as catalysts. The results are shown in Table 3.

Example 3 (Synthesis of Polymerized Rosin Compound 3 (Compound of Formula (1) in which R is Hydrogen or Methyl))

The same reaction process as in Example 1 was performed under the conditions shown in Table 1, except that 900 g of formic acid was used instead as a catalyst (also serving as a solvent). After the reaction was completed, 900 g of heptane was added to the reaction mixture. The formic acid layer was separated. The heptane solution of the reaction product was washed with 500 g of water and then further washed twice each with 500 g of water. After the washing, the heptane solution was subjected to the same process as in Example 1. The results are shown in Table 3.

Example 4 (Synthesis of Polymerized Rosin Compound 4 (Compound of Formula (1) in which R is Hydrogen or Methyl))

The same reaction process as in Example 1 was performed under the conditions shown in Table 1, except that 45.0 g of p-toluenesulfonic acid was used instead as a catalyst. After the reaction was completed, the same process as in Example 3 was performed. The results are shown in Table 3.

Example 5 (Synthesis of Polymerized Rosin Compound 5 (Compound of Formula (1) in which R is Hydrogen or Methyl))

The same reaction process as in Example 1 was performed under the conditions shown in Table 1, except that 36.0 g of methanesulfonic acid was used instead as a catalyst. After the reaction was completed, the same process as in Example 3 was performed. The results are shown in Table 3.

Example 6 (Synthesis of Polymerized Rosin Compound 6 (Compound of Formula (1) in which R is Hydrogen or Methyl))

The same reaction process as in Example 1 was performed under the conditions shown in Table 1, except that 36.0 g of methanesulfonic acid and 47.4 g of acetic acid were used instead as catalysts. After the reaction was completed, the same process as in Example 3 was performed. The results are shown in Table 3.

Example 7 (Synthesis of Polymerized Rosin Compound 7 (Compound of Formula (1) in which R is Hydrogen or Methyl))

The same reaction process as in Example 1 was performed under the conditions shown in Table 1, except that 19.5 g of Taycacure (solid acid catalyst with sulfonic acid groups as acid components) manufactured by Tayca Corporation was used instead as a catalyst. After the reaction was completed, 68.3 g of heptane was added to the reaction mixture. The heptane solution of the reaction product and the solid acid catalyst were separated from each other. The heptane solution of the reaction product was washed with 16 g of water. After the washing, the heptane solution was subjected to the same process as in Example 1. The results are shown in Table 3.

Example 8 (Synthesis of Polymerized Rosin Compound 8 (Compound of Formula (1) in which R is Hydrogen or Methyl))

The same reaction process as in Example 1 was performed under the conditions shown in Table 1, except that 22.7 g of AMBERLYST (solid acid catalyst with sulfonic acid groups as acid components) manufactured by ORGANO CORPORATION was used instead as a catalyst. After the reaction was completed, the same process as in Example 7 was performed. The results are shown in Table 3.

Example 9 (Synthesis of Polymerized Rosin Compound 9 (Compound of Formula (1) in which R is Hydrogen or Ethyl))

The same reaction process as in Example 1 was performed under the conditions shown in Table 1, except that 900 g of prototype 2 (purified rosin ethyl ester) produced by ARAKAWA CHEMICAL INDUSTRIES, LTD. and 36.0 g of methanesulfonic acid as a catalyst were used instead. After the reaction was completed, the same process as in Example 3 was performed. The results are shown in Table 3.

Example 10 (Synthesis of Polymerized Rosin Compound 10 (Compound of Formula (1) in which R is Hydrogen or Butyl))

The same reaction process as in Example 1 was performed under the conditions shown in Table 1, except that 900 g of prototype 3 (purified rosin butyl ester) produced by ARAKAWA CHEMICAL INDUSTRIES, LTD. and 36.0 g of methanesulfonic acid as a catalyst were used instead. After the reaction was completed, the same process as in Example 3 was performed. The results are shown in Table 3.

Example 11 (Synthesis of High-Molecular-Weight Linear Polymer (Rosin Polyester or Polyester Resin) Using Polymerized Rosin Compound))

A 1 L of separable flask equipped with a thermometer, a nitrogen introducing tube, a manifold, and a stirrer was charged with 316 g of polymerized rosin compound 1 obtained in Example 1, 90 g of 1,4-butanediol, and 5 g of tetrabutyl titanate. The mixture was heated to 235° C. and then subjected to a transesterification reaction while the temperature was maintained for 5 hours and methanol was removed. Subsequently, 101 g of sebacic acid was added, and the mixture was heated from 195 to 245° C. over 3.5 hours. The temperature was then maintained for 2.5 hours so that the esterification was completed to form a high-molecular-weight polymer (polyester resin). The reaction liquid had an acid value of 3.3 mgKOH/g. Subsequently, the reflux dehydrator was replaced by a vacuum decompression device, and a polycondensation reaction was performed under vacuum (a reduced pressure of 400 Pa or less). The reaction was completed after 6.5 hours. The main peak of the molecular weight distribution of the resulting polyester resin was at a number average molecular weight (Mn) of 10,000 and a weight average molecular weight (Mw) of 22,000. The resulting polyester resin had an Mw/Mn ratio of 2.2, an acid value of 0.6 mgKOH/g, and a hydroxyl value of 5.5 mgKOH/g. The polymerized rosin compounds of Examples 2 to 10 were also subjected to the same reaction process. The results are shown in Table 4.

Comparative Example 1 (Synthesis of Polymerized Rosin 1)

The same process as in Example 1 was performed under the reaction conditions shown in Table 1, except that 900 g of crude rosin (Chinese gum rosin) and 40 g of zinc chloride and 6.0 g of sulfuric acid as catalysts were used instead. GC/MS measurement was performed as follows. Polymerized rosin 1 was dissolved in a 1:1 mixed solution of toluene and methanol. A few drops of a hexane solution of 10% trimethylsilyldiazomethane manufactured by AZmax Corporation was then added to the solution so that polymerized rosin 1 was subjected to methyl esterification. Subsequently, the reaction mixture was subjected to GC/MS analysis. The results are shown in Table 3.

Comparative Example 2

Polymerized rosin 2 (SYLVAROS PR140 (trade name) manufactured by Arizona Chemical Ltd.) was subjected to methyl esterification and then to analysis in the same manner as in Comparative Example 1. The results are shown in Table 3.

Comparative Example 3

Polymerized rosin 3 (Dimerex (trade name) manufactured by Hercules Inc.) was subjected to methyl esterification and then to analysis in the same manner as in Comparative Example 1. The results are shown in Table 3.

Comparative Example 4

Polymerized rosin 4 (ARADIME R-140 (trade name) manufactured by ARAKAWA CHEMICAL INDUSTRIES, LTD.) was subjected to methyl esterification and then to analysis in the same manner as in Comparative Example 1. The results are shown in Table 3.

Comparative Example 5 (Synthesis of Polymerized Rosin Compound 11)

A reactor equipped with a thermometer, a stirrer, and a nitrogen introducing tube was charged with 10 g of polymerized rosin compound 1 obtained in Example 1 and 90 g of prototype 1 (purified rosin methyl ester) produced by ARAKAWA CHEMICAL INDUSTRIES, LTD. The mixture was heated to 150° C., and then the temperature was maintained with stirring for 1 hour, so that 100 g of polymerized rosin compound 11 was obtained. GPC measurement showed that polymerized rosin compound 11 had a rosin dimer component (A) content of 9.2% (bifunctional rosin dimer component (a1) content: 100%), a content of rosin acid and rosin ester monomers of 90.5%, and a content of the rosin trimer or higher oligomer component (B) of 0.3%.

Comparative Example 6 (Synthesis of Polymerized Rosin Compound 12)

Using the same process as in Comparative Example 5, the materials were mixed according to the formulation shown in Table 2. The results are shown in Table 3.

Comparative Example 7 (Synthesis of Polymerized Compound 13)

Using the same process as in Comparative Example 5, the materials were mixed according to the formulation shown in Table 2. The results are shown in Table 3.

Comparative Example 8 (Synthesis of Polymerized Rosin Compound 14)

A reactor equipped with a thermometer, a stirrer, a nitrogen introducing tube, and a pressure reducing device was charged with 100 g of polymerized rosin (ARADIME R-140 (trade name) manufactured by ARAKAWA CHEMICAL INDUSTRIES, LTD.) with an acid value of 146.0 mgKOH/g and a softening point of 137° C., 100 g of xylene, and 83.3 g of methanol. With stirring, 46.4 g of thionyl chloride was added dropwise to the reactor over 2 hours so that the polymerized rosin was subjected to methyl esterification. After the dropwise addition was completed, the mixture was heated with stirring at a reflux temperature for 5 hours. Subsequently, xylene and methanol were removed by distillation under the conditions of a liquid temperature of less than 200° C. and a reduced pressure of 1,300 Pa. Decomposition products of rosin methyl eater and rosin methyl ester were then removed by distillation under the conditions of a liquid temperature of 275° C. and a reduced pressure of 150 Pa, so that 55 g of polymerized rosin compound 14 was obtained. Polymerized rosin compound 14 had a softening point of 109° C. and an acid value of 1.8 mgKOH/g. GC/MS measurement showed that the monofunctional rosin dimer component (a2) and the functional group-free rosin dimer component (a3) were detected in the rosin dimer component (A). GPC measurement showed that polymerized rosin compound 14 had a rosin dimer component (A) content of 87.8% (the rosin dimer component (A) had a bifunctional rosin dimer component (a1) content of 51.7%, a monofunctional rosin dimer component (a2) content of 48.1%, and a functional group-free rosin dimer component (a3) content of 0.2%), a content of rosin acid and rosin ester monomers of 2.8%, and a content of the rosin trimer or higher oligomer component (B) of 9.4%.

(Synthesis of Polymers Using Polymerized Rosin Methyl Ester)

The polymerized rosin compound or the polymerized rosin ester of each of Comparative Examples 1 to 8 was subjected to the same reaction process as in Example 11. The results are shown in Table 4.

TABLE 1

| | Weight (g) | | | | | Temperature (° C.) | Time (h) |
|---|---|---|---|---|---|---|---|
| | Prototype 1 | Prototype 2 | Prototype 3 | Crude rosin | Xylene | | |
| Example 1 | 900 | — | — | — | 900 | 145 | 6 |
| Example 2 | 900 | — | — | — | 900 | 100 | 4 |
| Example 3 | 900 | — | — | — | — | 103 | 15 |
| Example 4 | 900 | — | — | — | 300 | 145 | 6 |
| Example 5 | 900 | — | — | — | 300 | 145 | 2 |
| Example 6 | 900 | — | — | — | — | 120 | 2 |
| Example 7 | 98 | — | — | — | 25 | 110 | 7 |
| Example 8 | 114 | — | — | — | 28 | 80 | 10 |
| Example 9 | — | 900 | — | — | 300 | 145 | 2 |
| Example 10 | — | — | 900 | — | 300 | 145 | 2 |
| Comparative Example 1 | — | — | — | 900 | 900 | 100 | 6 |

TABLE 2

| | Polymerized rosin compound | Prototype 1 |
|---|---|---|
| Comparative Example 5 | 10 | 90 |
| Comparative Example 6 | 50 | 50 |
| Comparative Example 7 | 70 | 30 |

TABLE 3

| | GPC peak area ratio (%) | | | | | | |
|---|---|---|---|---|---|---|---|
| | | Rosin dimer component (A) | | | | | |
| | Rosin trimer or higher oligomer component (B) | Bifunctional rosin dimer component (a1) | Monofunctional rosin dimer component (a2) | Functional group-free rosin dimer component (a3) | Monomer (rosin acid and rosin ester) component | Acid value (mgKOH/g) | Softening point (° C.) |
| Example 1 | 3.0 | 91.6 | 0 | 0 | 5.4 | 0.5 | 110 |
| Example 2 | 1.5 | 93.0 | 0 | 0 | 5.5 | 1.7 | 110 |
| Example 3 | 2.6 | 94.7 | 0 | 0 | 2.7 | 0.4 | 109 |
| Example 4 | 2.0 | 94.5 | 0 | 0 | 3.5 | 0.7 | 110 |
| Example 5 | 3.1 | 95.8 | 0 | 0 | 1.1 | 0.6 | 111 |
| Example 6 | 1.8 | 95.5 | 0 | 0 | 2.7 | 7.9 | 114 |
| Example 7 | 3.7 | 92.6 | 0 | 0 | 3.7 | 2.5 | 110 |
| Example 8 | 2.3 | 92.5 | 0 | 0 | 5.2 | 0.5 | 109 |
| Example 9 | 2.7 | 94.7 | 0 | 0 | 2.6 | 0.5 | 89 |
| Example 10 | 3.1 | 92.8 | 0 | 0 | 4.1 | 0.7 | 64 |
| Comparative Example 1 | 7.0 | 33.1 | 25.8 | 0.2 | 33.9 | 145 | 140 |
| Comparative Example 2 | 19.0 | 35.1 | 25.9 | 0 | 20.0 | 140 | 139 |
| Comparative Example 3 | 10.0 | 40.1 | 20.9 | 0 | 29.0 | 141 | 145 |
| Comparative Example 4 | 6.6 | 31.6 | 29.4 | 0.3 | 32.1 | 145 | 140 |
| Comparative Example 5 | 0.3 | 9.2 | 0 | 0 | 90.5 | 0.3 | — |
| Comparative Example 6 | 1.5 | 45.8 | 0 | 0 | 52.7 | 0.2 | — |
| Comparative Example 7 | 2.1 | 64.1 | 0 | 0 | 33.8 | 0.2 | — |
| Comparative Example 8 | 9.4 | 45.4 | 42.2 | 0.2 | 2.8 | 1.8 | 109 |

In Examples 1 to 8, the dimethyl ester group-containing rosin dimer makes up almost the whole of the bifunctional rosin dimer component (a1). In Example 9, the diethyl ester group-containing rosin dimer makes up almost the whole of the bifunctional rosin dimer component (a1). In Example 10, the dibutyl ester group-containing rosin dimer makes up almost the whole of the bifunctional rosin dimer component (a1).

TABLE 4

| | Number average molecular weight (Mn) | Weight average molecular weight (Mw) | Molecular weight dispersity (Mw/Mn) | Acid value (mgKOH/g) | Hydroxyl value (mg/KOH/g) |
|---|---|---|---|---|---|
| Example 1 | 10000 | 22000 | 2.20 | 0.6 | 5.5 |
| Example 2 | 11700 | 23900 | 2.04 | 0.7 | 6.0 |
| Example 3 | 11900 | 25000 | 2.10 | 0.7 | 6.1 |
| Example 4 | 10800 | 23500 | 2.18 | 0.6 | 6.0 |
| Example 5 | 11800 | 26000 | 2.20 | 0.7 | 6.0 |
| Example 6 | 11900 | 24000 | 2.02 | 0.7 | 6.2 |
| Example 7 | 11200 | 24500 | 2.19 | 0.8 | 5.8 |
| Example 8 | 10500 | 22000 | 2.10 | 0.7 | 6.0 |
| Example 9 | 11800 | 25000 | 2.12 | 0.5 | 5.9 |
| Example 10 | 11300 | 24500 | 2.17 | 0.7 | 6.0 |
| Comparative Example 1 | 770 | 2800 | 3.63 | 0.7 | 6.0 |

TABLE 4-continued

|  | Number average molecular weight (Mn) | Weight average molecular weight (Mw) | Molecular weight dispersity (Mw/Mn) | Acid value (mgKOH/g) | Hydroxyl value (mg/KOH/g) |
|---|---|---|---|---|---|
| Comparative Example 2 | 670 | 2700 | 4.03 | 0.7 | 6.0 |
| Comparative Example 3 | 660 | 2500 | 3.79 | 0.7 | 6.0 |
| Comparative Example 4 | 770 | 2800 | 3.63 | 0.7 | 6.0 |
| Comparative Example 5 | 690 | 1400 | 2.03 | 0.6 | 5.5 |
| Comparative Example 6 | 1600 | 3100 | 1.94 | 0.4 | 5.4 |
| Comparative Example 7 | 2100 | 4250 | 2.02 | 0.8 | 5.4 |
| Comparative Example 8 | 1400 | 4900 | 3.50 | 0.7 | 5.9 |

TABLE 5

|  | Glass transition temperature (° C.) | Thermal decomposition temperature (° C.) |
|---|---|---|
| Example 1 | 150 | 394 |
| Example 2 | 145 | 393 |
| Example 3 | 151 | 394 |
| Example 4 | 148 | 395 |
| Example 5 | 151 | 392 |
| Example 6 | 147 | 393 |
| Example 7 | 150 | 393 |
| Example 8 | 149 | 394 |
| Example 9 | 152 | 391 |
| Example 10 | 151 | 394 |
| Comparative Example 1 | 90 | 305 |
| Comparative Example 2 | 98 | 301 |
| Comparative Example 3 | 99 | 302 |
| Comparative Example 4 | 91 | 311 |
| Comparative Example 5 | 94 | 310 |
| Comparative Example 6 | 95 | 305 |
| Comparative Example 7 | 98 | 301 |
| Comparative Example 8 | 99 | 306 |

What is claimed is:

1. A polymerized rosin composition comprising:
a rosin dimer component (A) which comprises a bifunctional rosin dimer component (a1) represented by formula (1): ROOC—X—COOR,
wherein X represents a rosin dimer residue derived from resin acid having conjugated double bonds which is at least one selected from the group consisting of abietic acid, neoabietic acid, and palustric acid, and R represents hydrogen, an alkyl group of 1 to 5 carbon atoms, or a benzyl group,
the polymerized rosin composition comprises a content of the bifunctional rosin dimer component (a1) of 91.6% by weight or more, and
a rosin trimer or higher oligomer component (B) of 1.5 to 3.7% by weight,
wherein the rosin dimer component is free of a monofunctional rosin dimer component (a2) having one functional group represented by formula (2): ROOC—, wherein R represents hydrogen, an alkyl group of 1 to 5 carbon atoms, or a benzyl group, and a functional group-free rosin dimer component (a3) free of the functional group represented by formula (2): ROOC—, wherein R represents hydrogen, an alkyl group of 1 to 5 carbon atoms, or a benzyl group.

2. The polymerized rosin composition according to claim 1, wherein the bifunctional rosin dimer component (a1) comprises a dicarboxylate-containing rosin dimer (a10) represented by formula (1'): $R^1$OOC—X—COO$R^1$, wherein X represents a rosin dimer residue derived from resin acid having conjugated double bonds which is at least one selected from the group consisting of abietic acid, neoabietic acid, and palustric acid, and $R^1$ represents an alkyl group of 1 to 5 carbon atoms or a benzyl group.

3. The polymerized rosin composition according to claim 2, wherein the dicarboxylate-containing rosin dimer (a10) represented by formula (1'): $R^1$OOC—X—COO$R^1$, wherein X represents a rosin dimer residue derived from resin acid having conjugated double bonds which is at least one selected from the group consisting of abietic acid, neoabietic acid, and palustric acid, and $R^1$ represents an alkyl group of 1 to 5 carbon atoms or a benzyl group, comprises a dimethyl ester group-containing rosin dimer represented by formula (1"): $CH_3$OOC—X—COOCH$_3$, wherein X represents a rosin dimer residue derived from resin acid having conjugated double bonds which is at least one selected from the group consisting of abietic acid, neoabietic acid, and palustric acid.

* * * * *